INVENTOR
Giusto Fonda-Bonardi

May 17, 1966     G. FONDA-BONARDI     3,252,047
CLOSED PATH PLASMA ACCELERATOR
Filed Dec. 6, 1960     4 Sheets-Sheet 2

To Polyphase Signal Generator-27-

INVENTOR:
Giusto Fonda-Bonardi

By Richard K. Ehrlich
Attorney

May 17, 1966  G. FONDA-BONARDI  3,252,047
CLOSED PATH PLASMA ACCELERATOR
Filed Dec. 6, 1960  4 Sheets-Sheet 3
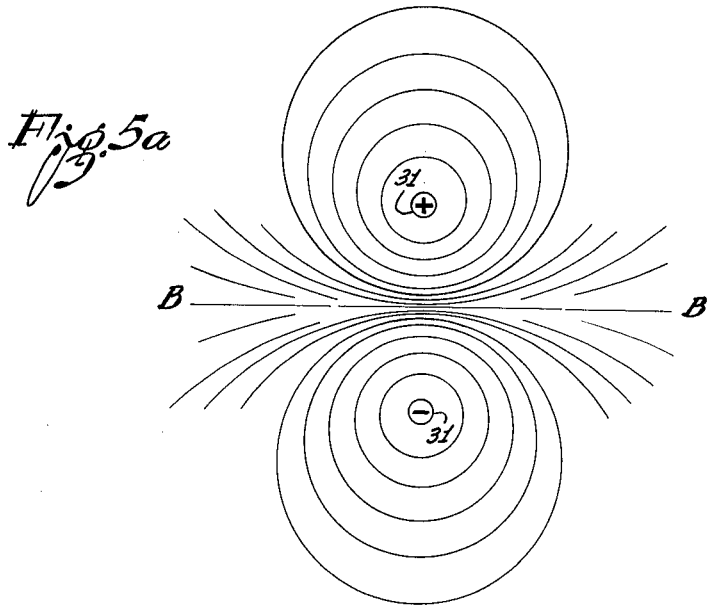
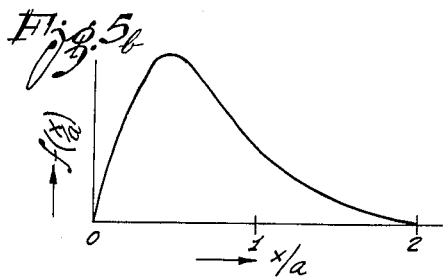
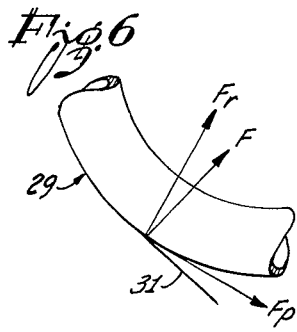
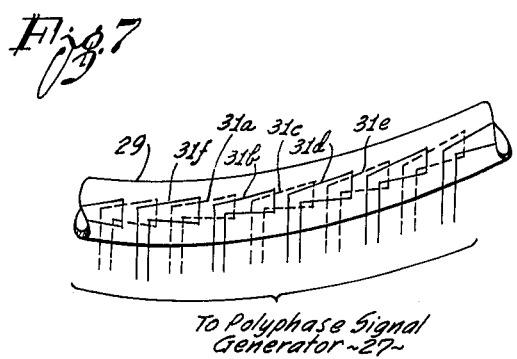
INVENTOR:
Giusto Fonda-Bonardi
By Richard K. Ehrlich
Attorney

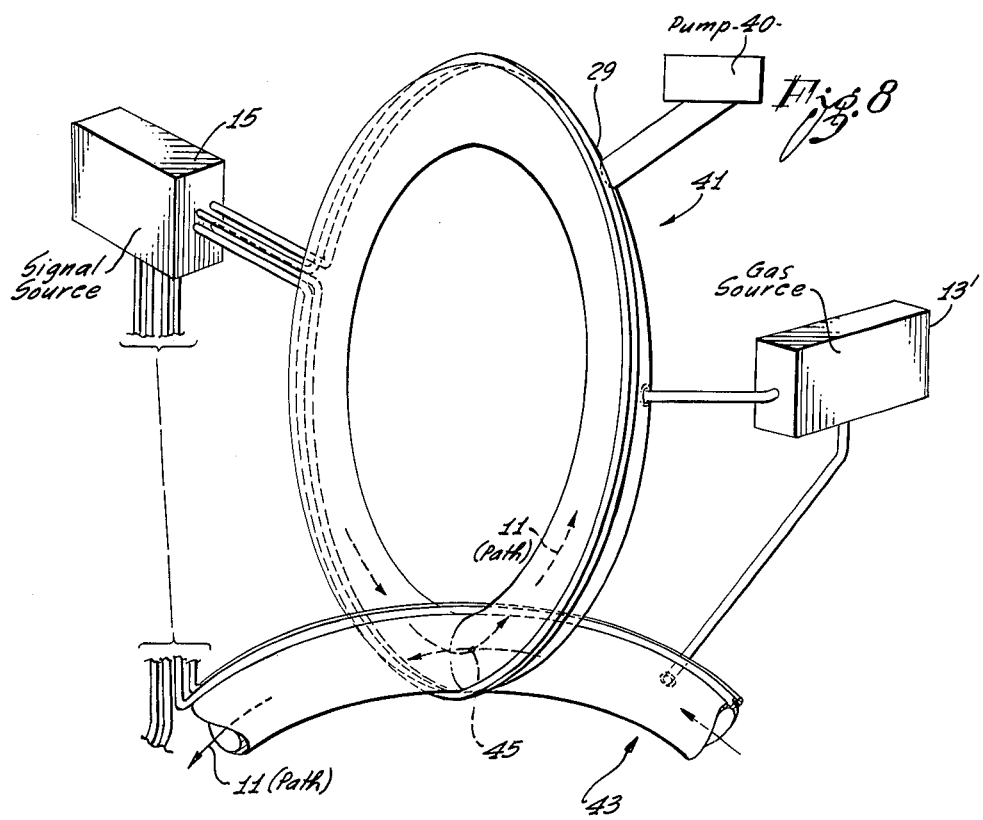

United States Patent Office 3,252,047
Patented May 17, 1966

3,252,047
CLOSED PATH PLASMA ACCELERATOR
Giusto Fonda-Bonardi, Los Angeles, Calif., assignor to Litton Systems, Inc., Beverly Hills, Calif.
Filed Dec. 6, 1960, Ser. No. 74,031
5 Claims. (Cl. 315—111)

The present invention relates to a closed path plasma accelerator and more particularly to a closed path plasma accelerator for use in nuclear fusion reactor.

It is common knowledge that because of the limited supply of conventional fuels such as coal, oil, and natural gas, much attention has been directed toward a new source of energy, namely, nuclear fusion. It is apparent that almost an unlimited amount of energy could be obtained from nuclear fusion since one of the basic fusion fuels is deuterium or heavy hydrogen which is contained in the oceans in inexhaustible amounts. Accordingly, if a nuclear fusion reactor could be mechanized to yield useful power, the earth's fuel supply problem would be forever solved.

Examining generally what is necessary to obtain a thermonuclear fusion reactor of a useful type, or in other words, one that produces more energy than it uses, it must be realized that the fuel used in the reaction must be raised to an ignition point or, in other words, the nuclei of the fuel must contain sufficient energy so that they will collide with sufficient violence to stick together or fuse. One of the basic problems is that this ignition point is equivalent to hundreds of millions of degrees centigrade. This present great difficulties. Referring to the ignition point of a specific fuel, for example, deuterium or heavy hydrogen, it can be theoretically shown that if one starts with a mass of deuterium gas plasma at standard temperature and pressure and raises the temperature of the mass to 100 million degrees some deuterium atoms can be made to fuse thereby releasing energy. It should be noted that at this temperature the pressure of the mass, if held in the same volume, will be 22 million pounds per square inch. However, at this temperature and pressure, the reaction is still not self-sustaining, the reaction becoming self-sustaining at about 350 million degrees centigrade.

Upon considering the foregoing, two facts become evident. One is that if the energy necessary to sustain a fusion reaction is to be introduced into a plasma by means of the random motion of the plasma nuclei, or in other words, by raising the temperature of the plasma, the density of the plasma must be extremely low in order that at 350 million degrees the pressure of the gas will be within controllable bounds. It is clear, however, that working with gases at such low density involves the solving of numerous difficult problems. Secondly, it is clear that the walls of any container used to contain the plasma cannot be maintained at or near the temperature of the plasma since no material known to man would remain in a liquid or solid state at that temperature. On the other hand, if the walls of the container are not maintained at or near the temperature of the plasma, it is clear that the contact with the walls will cool the plasma down, thus quenching the reaction, so that a continuous fusion reaction could not be maintained.

It has occurred to a number of scientists that the problem of confining a very hot gas within a material chamber without allowing any appreciable amount of the gas to reach the chamber walls could be solved by confining the plasma within a magnetic field which would keep the plasma particles away from the container walls. According to the most prominent theory, a gas plasma diffuses very slowly, or, is pinched in a strong magnetic field so that a magnetic field can be used to isolate a plasma from the walls of the containing vessel.

Prior art experimentation along the foregoing lines has uncovered a number of serious difficulties in attempting to mechanize a thermonuclear reactor in accordance with the theory. For example, because the plasma must be of such low density, collisions between nuclei are relatively infrequent and thus it would be required that the confinement or pinch period be maintained for as long as several seconds to produce a thermal fusion reaction. However, it has been known theoretically and found through experimentation that while a plasma can be pinched or compressed according to the theory, the pinch lasts only a few millionths of a second, the plasma then twisting or snaking violently and finally driving itself into the container wall. Furthermore, it was discovered that the tighter the pinch compression, the faster was the twisting and eventual destruction of the pinch effect. Thus, it has been impossible to maintain a column pinched sufficiently long to obtain a self-sustaining thermonuclear fusion reaction. Hence, it has been impossible to mechanize a useful thermonuclear fusion reactor.

As described in copending U.S. patent application No. 50,610, filed August 19, 1960, now Patent No. 3,155,592, by S. Hensen and G. Fonda-Bonardi entitled, "Fusion Reactor," the problems inherent in mechanizing a thermonuclear fusion reactor were avoided by using a pair of electrically neutral, unconfined, high density gas plasmas at relatively low temperatures to produce fusion energy. In accordance with the priciples of this non-thermonuclear method, oppositely directed translational velocities are imparted to the two plasma masses whereby the plasma masses collide in a reaction region, the plasma particles having sufficient translational kinetic energy to stick together or fuse upon collision. It should be noted in this regard that the temperature of the plasma need be only high enough to maintain plasma conductivity, i.e., of the order of 10,000 or 100,000° K. rather than 350,000,000° K.

Hence, in accordance with the above mentioned application, the energy required to induce a fusion reaction is obtained by accelerating plasma particles to substantially uniform, high, translational speeds, by means of a linear plasma accelerator rather than by imparting high random thermal motion to the plasma particles as was attempted in the prior art thermonuclear devices. Accordingly, the uncontrollable pressures encountered with high temperature thermonuclear motion are avoided so that the plasma can be controlled in a relatively simple manner.

The present invention provides a closed path plasma accelerator and an alternate type of plasma fusion reactor using the closed path accelerator wherein the plasma particles are accelerated angularly about a closed path rather than along a linear path to enter a region with a predetermined velocity. Accordingly, since the plasma particles recirculate cyclically about the closed path and thus are continuously subjected to the accelerating forces, the ultimate speeds of the particles are not limited by the accelerator length nor the magnitude of the accelerating force. Furthermore, the kinetic energy of that fraction of the plasma particles which have not reacted is conserved since the curvature of the closed path maintains the plasma particles which have not reacted to the reactor region. Thus, only sufficient additional energy is required to bring up to speed the new plasma added for replenishment.

In accordance with the invention, a curved or closed path is achieved by application of a radially directed inward force which can be generated by a magnetic field to the plasma particles for balancing the centrifugal force applied thereto as a result of the peripheral speed and curved path of the plasma particles. In addition, a tangential force which can be generated by a rotating magnetic field is applied to the plasma particles to accelerate the particles for bringing them up to the desired speed after which they circulate about the closed path at the desired speed.

In accordance with the invention, a pair of closed path plasma accelerators are positioned relative to one another in such a manner that their paths intersect to form a reaction region wherein the particles travelling along the path of one accelerator collide with the particles travelling along the path of the other accelerator, the relative velocities of the plasma particles being sufficient to insure that the particles experiencing collision fuse together whereby energy greatly in excess of that needed to accelerate the plasma particles is released.

When it is realized that only a small percentage of the plasma particles passing through the reaction region on any given pass collide, it is apparent that the present reactor is extremely efficient because the energy utilized to accelerate the particles which pass through the reaction region without colliding is not lost since the particles will continue to periodically pass through the reaction region until they do experience a collision.

Hence, once the plasma particles are brought up to a predetermined collision speed by the accelerators, only a small amount of input energy is needed to maintain a continuous fusion reaction since only those particles need be accelerated which have been added to the plasma as a replenishment for those which have collided and reacted, or have diffused away from the desired path. Therefore, an outstanding ratio of output to input energy can be obtained with the reactor of the present invention.

In one embodiment of the invention a gaseous mass of deuterium or 50% deuterium and 50% tritium introduced in the vicinity of a circular path of a closed path accelerator is ionized and then rotated around the circular path. More particularly, a high frequency signal is applied to a set of wires or conductors circumscribing the outside periphery of the circular path whereby the circular path is cut by a toroidal magnetic field produced by the A.C. current flowing in the conductors. The gas mass is first ionized and then constrained to the circular path by the induction of magnetic field generated by the A.C. current in the conductors which exerts a radially directed force on the plasma particles equal in magnitude to the centrifugal force tending to force the particles from the circular path.

In addition, a polyphase signal is applied to two or more pairs of stator coils positioned adjacent the exterior periphery of the circular path whereby circulating electrical currents are induced in the ionized plasma gas. The plasma particles follow the rotating magnetic field generated by the application of the polyphase signals to the stator windings, in much the same manner as a rotor of an induction motor is pulled or accelerated to follow the advancing stator field of the induction motor. Hence, the plasma mass is rotated about the circular path of the accelerator at a velocity equal to the velocity of the rotating magnetic field.

In a modified embodiment of the invention a plurality of sets of wires positioned in sequence around the exterior periphery of the path have applied thereto an A.C. signal for generating a rotating magnetic field which ionizes the plasma and exerts a tangential force as well as a radial force on the plasma.

In still another embodiment of the invention a pair of first and second closed path accelerators are positioned relative to one another so that the circular path of the first accelerator intersects the circular path of second accelerator to form a reaction region wherein particles accelerated by one accelerator collide with those accelerated by the other accelerator.

It is, therefore, an object of the present invention to provide a closed path accelerator.

It is another object of the present invention to provide a high efficiency fusion reactor utilizing a pair of closed path plasma accelerators.

It is a further object of the present invention to provide a plasma accelerator employing magnetic fields for accelerating a plasma along a curved path to return the plasma particles to their starting position.

It is a still further object of the present invention to provide a fusion reactor wherein the kinetic energy of the plasma particles passing through a region without reacting is conserved.

It is still another object of the present invention to provide a fusion reactor including a pair of first and second accelerators accelerating a pair of first and second plasma masses, respectively, along circular paths, the accelerators being positioned relative to one another in such a manner that the paths of the accelerators intersect to form a reaction region wherein the first plasma particles collide with and fuse with the second plasma particles.

The novel features which are believed to be characteristic of the invention both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 5 is a cross-sectional view of a pair of constraining conductors of FIG. 4 with the magnetic field lines surrounding the conductors indicated therein;

FIG. 5b is a graph of the magnetic field strength shown in FIG. 5a;

FIG. 6 is a fragmentary top view of the circular path of the accelerator shown in FIG. 3 indicating the nature of the forces exerted on the plasma;

FIG. 7 is a side fragmentary view of an alternate type of constraining conductor configuration; and FIG. 8 is an isometric view of a fusion reactor utilizing the closed path accelerators shown in FIG. 1.

Figure 1:
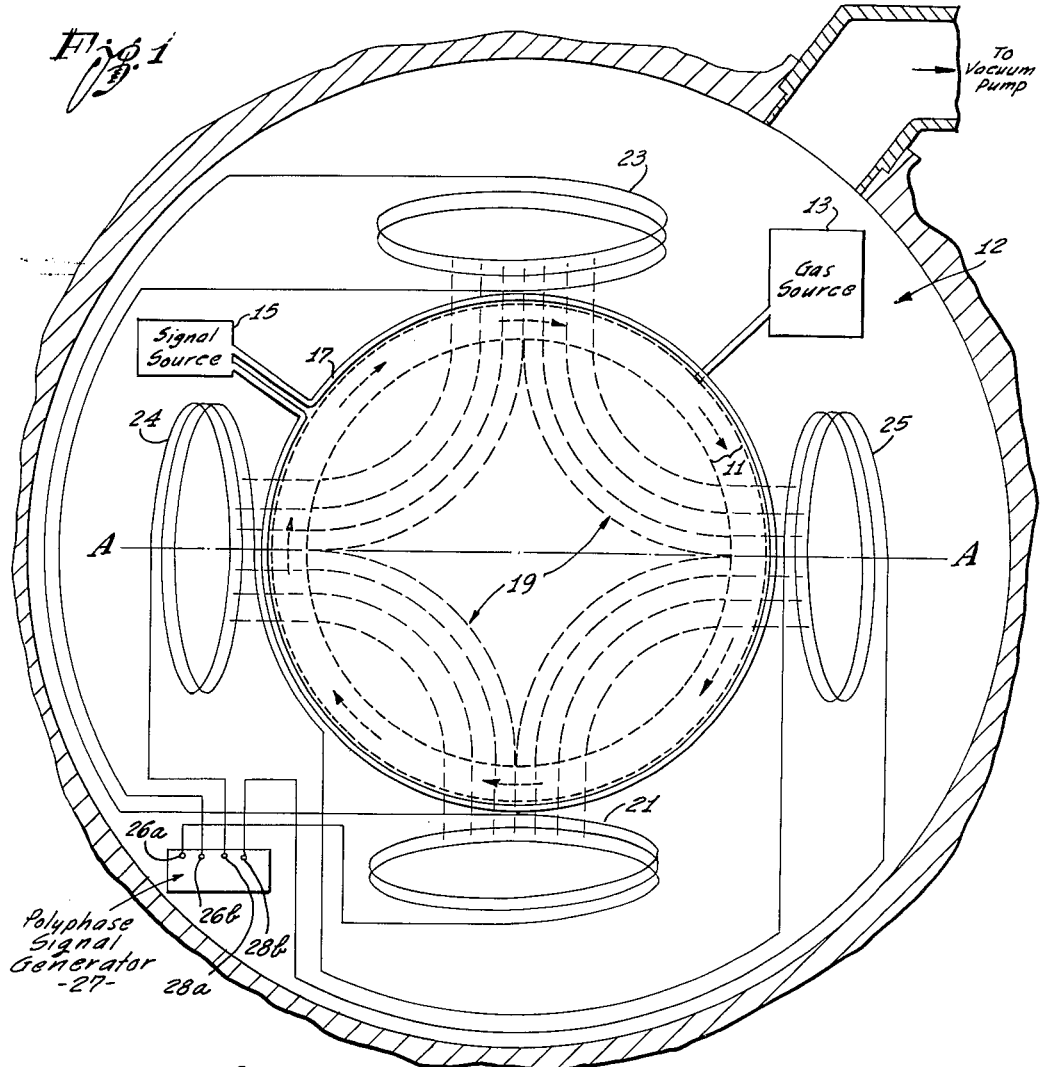
FIG. 1 is an illustrative view of one embodiment of a closed path accelerator of the present invention.

Referring now to the drawings wherein like or corresponding parts are designated by the same reference numerals throughout the several views, there is shown in FIG. 1 a closed path circular accelerator of the present invention positioned within a vacuum or evacuated chamber 12, a plasma or electrically neutral ionized gas being constrained to and accelerated about circular path 11 of the accelerator. In accordance with the invention, a gas, such as deuterium, injected in or near path 11, from a gas source 13 is ionized by a toroidal electromagnetic field produced by the application of a high frequency A.C. signal from a single source 15 to a set of two or more constraining conductors 17 which circumscribe the outside periphery of the circular path, the constraining conductors as will be hereinafter explained also being utilized to constrain the plasma to circular path 11.

As is further shown in FIG. 1, a pair of windings 21 and 23 are positioned adjacent the outside periphery of closed path 11, the windings being removed 180 degrees from each other. A pair of similar windings 24 and 25 are positioned in a like manner 180 degrees from each other and 90 degrees from windings 21 and 23. Since the windings are fixed in position relative to the circular path and since, as will be hereinafter disclosed, they function in substantially the same manner as do the stator windings of a two-phase induction motor, the windings will be referred to herein as stator windings. As is clear to those skilled in the art with the distribution of magnetic field lines shown in FIGURE 1, a second set of four additional coils should be positioned at 45° with respect to windings 21, 23, 24, and 25. This second set of windings has been omitted in the drawings for the sake of simplification. In this regard, since all of these windings function in substantially the same manner as do stator windings on any two phase induction motor, windings 21, 23, 24, and 25, as well as the omitted set are referred to as the stator windings.

As is indicated in FIG. 1, windings 21 and 23 are serially connected to a pair of terminals 26a and 26b of a polyphase signal generator 27 while windings 24 and 25 are serially connected to a pair of terminals 28a and 28b of the polyphase generator whereby an A.C. signal is applied to windings 24 and 25 in phase with the A.C. signal applied to windings 21 and 23 as is the case in a two-phase induction motor. The second, omitted set of four coils or windings is also energized by generator 27, but with signals 90° out of phase with the A.C. signals applied to windings 21, 23, 24, and 25, as is the case in any two phase induction motor. As is apparent from the foregoing, the currents flowing through the adjacent windings are displaced by some 90 degrees and since the magnetic fields generated in the coils by the currents are in phase with respect to the currents, the magnetic fields are also 90 degrees out of phase with each other.

Accordingly, since the coils adjacent each other produce magnetic fields 90° out of phase and periodically varying, the magnetic fields generated act to produce a magnetic field 19 which rotates around circular path 11 once during each period of the polyphase signal. As shown in FIG. 1, rotating magnetic field 19 cuts path 11 and the ionized plasma positioned therein and thus induces current flow within the plasma which in turn generates its own magnetic field. This magnetic field coacts with the field 19 to accelerate the plasma particles around the circular path slightly behind the rotating stator field. Hence, the plasma particles are caused to move in circular path 11.

Viewing the foregoing in another way, in accordance with Lenz's law an induced current tries to oppose the changing field which has induced it. Thus, the induced currents in the plasma exert a force thereon which tends to move the plasma around path 11 in order to attempt to cancel out the continuous motion of the stator field.

It should be noted that in accordance with the invention, a relatively small accelerating force can accelerate the plasma to almost any predetermined velocity since the accelerator path is circular and accordingly, the plasma can remain under the influence of the force for an indefinitely long period of time. Therefore, it becomes apparent that the plasma can be brought up to speed in a number of ways. For example, gas from gas source 13 can be introduced into the region in and around path 11 in small amounts so that the mass to be accelerated is small. Hence, it can be quickly accelerated to the angular velocity corresponding to the frequency of the polyphase signal. It is clear, of course, that by successive additions of small masses of gas a resultant mass of any given magnitude can be accelerated to any given velocity.

On the other hand, a relatively large mass of gas can be introduced at one time whereby the large mass is concurrently ionized and accelerated to the angular velocity corresponding to the frequency of the polyphase signal. Of course, it may require several revolutions of the gas about path 11 before it reaches its final frequency, the exact number of revolutions being related to the radius of path 11 and the magnitude of the accelerating force. In either case, however, a plasma mass of almost unlimited size can be accelerated to any predetermined velocity by an extremely small accelerating force.

Continuing with the discussion of the invention, attention is now directed to the operation of the accelerator as the plasma picks up speed and begins to develop a substantial velocity. As is clear from basic physics, if the plasma is not restrained the plasma particles will experience centrifugal forces which tend to force the plasma away from path 11. In order to prevent this movement, the accelerator is equipped with a set of constraining conductors 17 which have applied thereto high frequency A.C. signal from source 15, the high frequency currents flowing in the conductors generating a toroidal magnetic field configuration of the type shown in FIG. 2.

Figure 2:
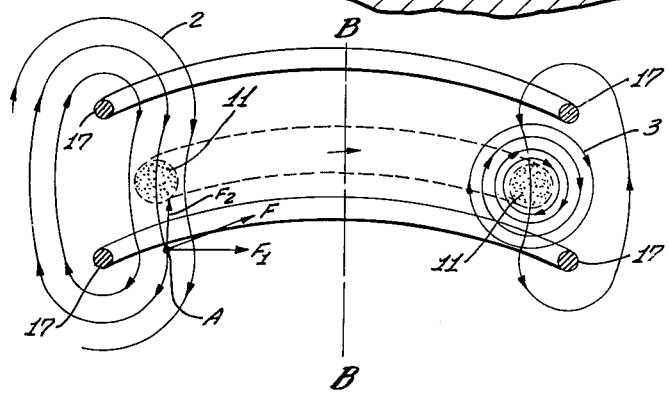
FIG. 2 is a cross-sectional view of the path of the accelerator of FIG. 1 depicting the field configuration surrounding the path.

Referring now to the cross-sectioned view along line A—A of FIG. 1 shown in FIG. 2, magnetic field 2 due to the A.C. current in conductors 17 is illustrated in FIG. 2 by flux lines 2. As is indicated in FIG. 2, magnetic field flux lines 2 traverse the plasma distributed along circular path 11, seen in FIG. 2 in cross section, and therefore, induce an electromotive force in the plasma in substantially the same manner as a voltage is induced in a secondary winding of a transformer. The electromotive force produces a current flow within the plasma which circulates peripherally about path 11 and this current flow, in turn, generates its own magnetic field 3 indicated in FIG. 2 by flux lines 3. Moreover, magnetic fields 3 and 2 interact to repel the current carrying plasma away from conductor 17 and toward the axis B—B of path 11. This repulsive effect is present in all inductive A.C. circuits and is dictated by Lenz's law.

In accordance with the present invention, the current flowing in conductor 17 is so adjusted that the repulsive force counterbalances the centrifugal force due to the rotation of the plasma about path 11. Furthermore, the pinch forces due to field 3 contain the plasma within, and define path 11 and, accordingly, limit the diffusion of the plasma away from path 11.

It should be noted in connection with FIG. 2 that the magnetic field lines are caused to be somewhat concave in shape so that, in addition to maintaining the plasma particles in a constant radial position, it also axially stabilizes the particles between the conductors. For example, assume that one or more plasma particles have drifted from the prescribed path 11 to a point designated A, as is shown in FIG. 2, the force exerted on the plasma at point A resulting from constraining magnetic field 2 is directed perpendicularly to the local direction of field 2, i.e., along the line indicated by the arrow designated F. However, this force F can be resolved into two components F1 and F2, F1 being radially oriented while F2 is oriented normal thereto and in a direction such as to return the plasma from position A to path 11. Accordingly, the constraining magnetic field insures that the plasma remains within the area defined by path 11 as it rotates about the axis of path 11.

As is apparent from the foregoing, no physical restraints such as walls are necessary to constrain the plasma to path 11. However, it is desirable to evacuate the area in and around path 11 so that foreign particles do not interfere with the plasma movement. As shown in FIG. 1, this is accomplished by placing the accelerator itself within vacuum chamber 12 whereby substantially all foreign particles are removed from the area in and around path 11 by a vacuum pump. It should be noted that in many applications the mechanization of the present invention is simplified by placing the accelerator in an existing chamber such as any one of a number of commercially available chambers. However, for obvious reasons in many other applications it is preferable to position source 15, generator 27 and gas source 13 outside of chamber 12. It should be noted that the pump also serves to remove from the vicinity of path 11 plasma particles which diffuse out of path 11.

In accordance with the invention, numerous alternations and modifications can be made in the foregoing described embodiment without departing from the invention. For example, if it is desired to operate the accelerator outside of a vacuum chamber 12, path 11 may be enclosed by a donut shaped tube and the tube evacuated by means of a pump so that only the area within the tube approximates a vacuum. Furthermore, the constraining conductors and the stator windings can be jointly mechanized so that a pair of conductors functions not only to constrain movement of the plasma particles away from path 11 but, in addition, provide the accelerating force for rotating the plasma about axis B—B. In other words, the same set of conductors can be mechanized to provide both the required centrifugal force component and the required peripheral force component.

Figure 3:
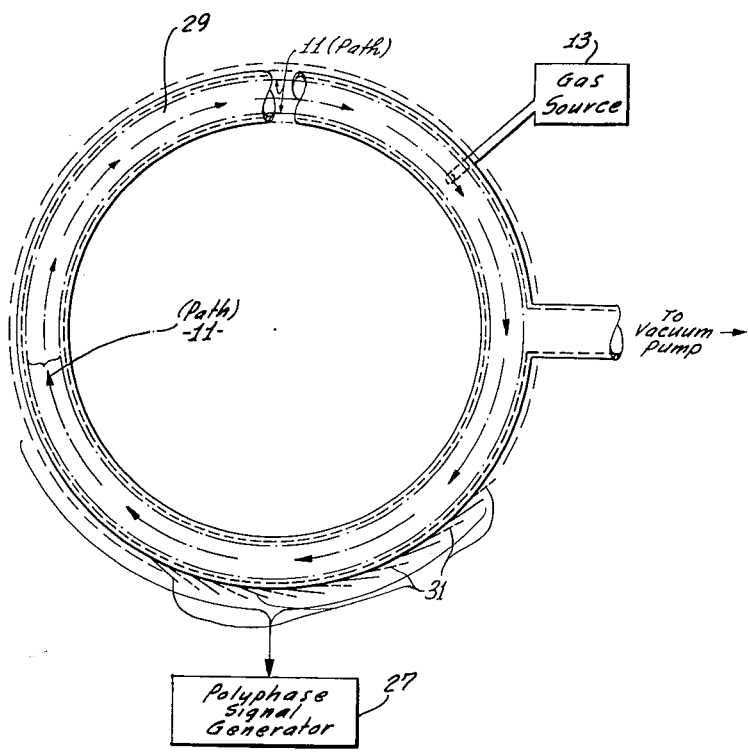
FIG. 3 is an illustrative view of another embodiment of a circular path accelerator of the present invention.
Figure 4:
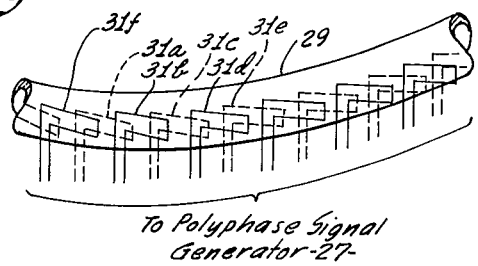
FIG. 4 is a side view of the circular path of the accelerator of FIG. 3 depicting the positioning of the constraining conductors relative to the circular path.

Referring now to FIG. 3, there is shown another embodiment of the invention operable without being placed in a vacuum chamber and which utilizes polyphase A.C. signals for both constraining and accelerating the plasma mass. More particularly, as shown in FIG. 3, path 11 is enclosed by a donut or toroidal shaped glass tube 29 which is pumped to approximate a hard vacuum. As is further indicated in FIG. 3, there is positioned adjacent the outside periphery of tube 29 a plurality of sequentially oriented U-shaped conductors connected to a polyphase signal generator 27. In order to better describe the positioning of the U-shaped conductors, attention is directed to FIG. 4 wherein there is shown a fragmentary side view of tube 29 and the associated conductors.

Continuing with the discussion of the invention, the U-shaped conductors are positioned in sequence around tube 29 each with its base parallel with the axis B—B of path 11 which is coincident with the axis of tube 29, and with its legs parallel with the direction of the plasma flow. The polyphase signals from generator 27 are applied to the conductors in substantially the same manner as the two-phase polyphase signals are applied to the stator winding of the embodiment of FIG. 7. For example, designating the conductors shown in FIG. 4 as 31a through 31f, if conductor 31a has applied thereto a signal having a relative phase angle of $\theta$, conductor 31b should have a signal applied thereto with a phase angle $\theta$ plus 90° while conductors 31c and 31d should have applied thereto a phase angle of $\theta$ plus 180° and $\theta$ plus 270°, respectively, and 31e should have the same signal applied thereto as was applied to conductor 31a. The foregoing sequence will continue, of course, until a circle has been completed and a signal having the phase relationship $\theta$ plus 270° is applied to conductor 31f. It should be noted that in order to insure that a graduated phase advancement of 90° is maintained between conductors the total number of conductors positioned around tube 29 should be some multiple of 4 in the case of a two-phase system.

It should be clear, of course, that generator 27 is not limited to a two-phase generator. For example, generator 27 could be mechanized as a three-phase generator in which case the phase advancement would be 60° between conductors and the same phase signal would be applied to every sixth conductor in sequence rather than every fourth one as in the case of the two-phase system.

Referring now specifically to the operation of the constraining and accelerating structure just described, attention is directed to FIG. 5a wherein there is depicted the magnetic field configuration formed by the oppositely polarized currents flowing through the two legs of each U-shaped conductor. As is indicated in FIG. 5a, a strong magnetic field gradient exists along the line marked B—B. If the field configuration is analytically examined, it can be shown that the force F is equal to:

$$F = K \frac{x/a}{(1+(x/a)^2)^3} \quad (1)$$

or $$F = K f(x/a) \quad (2)$$

where $a$ is the center to center distance between the legs of a conductor and $x$ is the distance along line B—B from the point of intersection of line B—B and a line joining the centers of the two legs of the conductor.

A graphical representation of Equation 2 is shown in FIG. 5b, examination of FIG. 5b reveals that the force F builds up rapidly to a strong maximum at $x=.45a$ and then rapidly falls off at distances greater than $.45a$. Accordingly, if the two legs of conductor 31 are positioned adjacent glass tube 29 in such a fashion that the distance just inside the glass wall is $.45a$, the force field set up prevents the plasma from contacting tube 29. More particularly, if the magnitude of the currents of the polyphase signals are so determined that the magnitude of the force exerted on the plasma particles at $.45a$ is just equal to the centrifugal force exerted on the plasma particles at that distance from the center of the plasma ring, it is clear that a force field is set up which provides maximum stability against variations of plasma diameter.

Continuing with the discussion of the invention, if the wire conductor shown in FIG. 5a is positioned at a small angle relative to the tangent of the path as is shown in FIG. 6, it is apparent that repulsive force F has a peripheral or tangential component $F_p$ as well as a radial component $F_r$, the peripheral or tangential component, of course, acting to drive the plasma around path 11. Accordingly, conductors 31 operate as both a constraining means and a means of accelerating the plasma.

It should be noted that the force configuration shown in FIG. 6 can alternately be produced by varying the spacing $a$ between the conductors. For example, there is shown in FIG. 7 an alternative configuration of conductors 31 wherein the spacing between the conductors becomes greater in the direction of plasma movement. It should be apparent to those skilled in the art that by increasing the spacing between the conductors the magnetic field produced thereby is diminished in the same manner as if the conductors were placed at a small angle to the tangent of path 11.

Continuing with the discussion of the invention, attention is directed to FIG. 8 wherein there is shown a fusion reactor of the present invention utilizing a pair of circular plasma accelerators 41 and 43 of the type shown in FIG. 1 having the tubes 29 surrounding paths 11 so that pump 40 can evacuate paths 11 to vacuum conditions and can remove therefrom plasma which diffuses out of path 11 as well as remove from path 11 reaction produced particles. More particularly, the accelerators are linked together in the same fashion that the links of a chain are interconnected. More particularly, the accelerators are positioned orthogonal one another and with their circular plasma paths overlapping or intersecting in a reaction region 45. As shown in FIG. 1, the accelerators include stator windings 21, 23, 24, and 25, which for reasons of clarity have been omitted from FIG. 8.

While a number of known fusion fuels can be accelerated in plasma form by the accelerators the use of deuterium and tritium gases as fusion fuels are preferable since they require a minimum amount of energy to fuse so that the plasma velocity can be minimized. Furthermore, it is preferably to mix the deuterium and tritium gases and to apply the mixed gas to both accelerators as is shown in FIG. 8. Since the two accelerators, operating on the same plasma mixture, can be identical, as shown in FIG. 8, only one single generator 27, (not shown) one gas source 13, and one signal source 15 is needed to mechanize the fusion reactor.

Referring now to source 13, it is apparent from FIG. 8 that source 13 emits gas into paths 11 of accelerators 41 and 43. More particularly, source 13 is mechanized in such a fashion that it emits a gas mass composed of 3 parts by weight of tritium to two parts by weight of deuterium. Considering the fact that the atomic weight of deuterium is two and that of tritium is three, it is clear that source 13 emits a gas containing equal numbers of deuterium and tritium atoms. The use of a gas containing equal numbers of deuterons and tritons is preferred, of course, since it provides the greatest probability of a deuteron-triton collision.

Considering now with particularity the angular velocity needed to insure that a continuous useful fusion reaction occurs, it should be noted that the probability of a fusion type collision increases rapidly with speed to a resonant peak and then falls off rapidly. In the case of the D-T (deuterium-tritium) reaction, this resonant peak occurs when the total energy of the two colliding particles is 110 kev.

It can be shown analytically that in the case of deuterium ions or deutrons colliding with tritium ions, or tritons, that the relative velocity of the deuterons should be $3.24 \times 10^6$ meters/seconds in order that the colliding nuclei have a relative energy of 110 kev. It is clear, of course, that this velocity can be resolved in vector fashion between the two plasma masses. Accordingly, since the plasmas are moving at the right angles to each other, the final velocity of each plasma mass should be equal to:

$$\frac{1}{\sqrt{2}} (3.24 \times 10^6) \quad (3)$$

or $$2.29 \times 10^6 \text{ meters/seconds} \quad (4)$$

It is apparent that in order to insure the continuous occurrence of a fusion reaction, the fusion collision event must be favored while the probability of competing events such as ionization and scattering collisions as well as electromagnetic radiation must be minimized. In the present invention, ionizing collisions are avoided since the plasmas maintain a state of total ionization as well as average charge neutrality as a result of the applied electromagnetic fields. Scattering collisions with ambient gases are avoided since the plasma paths are evacuated.

Comparing the reactor of the present invention to prior art reactors, it is clear that the efficiency of the present reactor is for the most part independent of how many of the total number of ions passing through the reaction region on any given pass experience a fusion collision. The foregoing is the case since those ions not experiencing a fusion collision rotate around their respective path until they do experience such a collision, little or no acceleration being needed to maintain the speed of the ions as they circulate around the path once they have achieved their predetermined final velocity.

It should be clear from the foregoing that numerous other modifications and alterations may be made in the invention without departing from the scope of the invention. For example, the positioning of accelerators 41 and 43 can be varied so that the plasmas intersect at other than right angles. For example, the accelerators could be positioned in such a manner that the paths intersect at 45 degrees, or 15 degrees. It is clear, of course, that as the angle between the two accelerator planes are reduced, the angular velocity of the plasmas about their respective paths can also be reduced since the plasmas tend to be moving more toward one another, or, more particularly, the relative velocities of the plasmas are increased.

It should be clear from the foregoing discussion that numerous fusion fuels can be used with the reactor of the invention instead of just the deuterium-tritium gases herein mentioned. Furthermore, uses other than infusion reactors can be found for the plasma accelerators of the present invention. More particularly, the accelerators can be used in nuclear research for accelerating neutral plasmas to substantial velocities. Accordingly, it is to be expressly understood that the spirit and scope of the invention is to be limited only by the scope of the appended claims.

What is claimed as new is:

1. In a plasma accelerator for accelerating a continuous stream of gas plasma about a circular path, the combination comprising: a plurality of generally U-shaped conductors positioned sequentially around the exterior periphery of the circular path; a source of a plurality of high frequency signals having a predetermined graduated phase relationship with respect to one another; and coupling means interconnecting said conductors and said signal source to apply said signals to said conductors, the phase of the signal applied to each of said conductors being greater than the phase of the signal applied to the preceding conductor in sequence and less than the phase of the signal applied to the subsequent conductor in sequence whereby a rotating magnetic field cutting across the circular path is produced, said conductors being positioned relative to the periphery of the circular path to orient said rotating magnetic field to exert a tangential and a radial force on the gas plasma.

2. In an accelerator for accelerating a plasma about a circular path, the combination comprising: first means for introducing a gas in the vicinity of the circular path; a plurality of generally U-shaped conductors positioned in sequence around the exterior periphery of the circular path; and a source of high frequency signals connected to said plurality of conductors for generating a magnetic field traversing the circular path and rotating thereabout, said magnetic field exerting a tangentially oriented force on the plasma within the closed path to rotate the plasma about the circular path and a radially oriented force on the plasma equal in magnitude but opposite in direction to the centrifugal force produced by the plasma rotation.

3. In an accelerator for accelerating a plasma about a circular path, the combination comprising: first means for introducing a gas in the vicinity of the circular path; and a plurality of conductors positioned in sequence around the exterior periphery of the circular path, each conductor including a pair of non-parallel legs and apparatus conductively connecting said legs so that upon application of a predetermined signal to said legs oppositely directed currents flow through said legs; and a polyphase source of A.C. signals connected to said legs of said conductors for applying to said conductors A.C. signals having relative phase relationships to produce a rotating magnetic field traversing the circular path, said magnetic field exerting a tangentially oriented force on the plasma as well as a radially oriented force.

4. In an accelerator for accelerating a plasma about a closed path, the combination comprising:
a plurality of generally U-shaped conductors positioned sequentially around the exterior periphery of said closed path; and a source of high frequency signals coupled to said plurality of conductors for generating a magnetic field traversing said closed path and moving therealong, said magnetic field exerting a tangentially oriented force on said plasma within said closed path to move said plasma about said closed path and a inwardly-oriented force on said plasma substantially equal in magnitude but opposite in direction to the outwardly-oriented force produced by the motion of said plasma.

5. In a recirculating plasma accelerator for accelerating a plasma gas about a closed path, the combination comprising: means for generating a magnetic accelerating field moving about the closed path, said means including a plurality of windings sequentially disposed entirely outside the exterior periphery of the closed path, each of said windings lying in a corresponding surface generally parallel to the direction of acceleration of said plasma; means for introducing a gaseous plasma mass in the vicinity of said magnetic accelerating field, said magnetic accelerating field accelerating the plasma gas about the closed path; and means for generating a magnetic field for confining the plasma to the closed path.

References Cited by the Examiner

UNITED STATES PATENTS

| | | | |
|---|---|---|---|
| 2,922,061 | 1/1960 | Teng | 313—62 |
| 2,961,559 | 11/1960 | Marshall | 313—63 |
| 2,992,345 | 7/1961 | Hansen | 313—63 |
| 2,993,851 | 7/1961 | Thomson et al. | |
| 3,009,080 | 11/1961 | Loos | 313—63 X |
| 3,029,199 | 4/1962 | Baker et al. | 313—63 X |
| 3,031,398 | 4/1962 | Tuck | 204—193.2 |
| 3,059,149 | 10/1962 | Salisbury | 315—267 |
| 3,072,551 | 1/1963 | Schlelein | 204—193.2 |
| 3,084,629 | 4/1963 | Yevick | 204—154.5 X |
| 3,113,427 | 12/1963 | Meyer | 313—63 |

FOREIGN PATENTS

| | | |
|---|---|---|
| 607,300 | 10/1960 | Canada. |
| 1,068,824 | 11/1959 | Germany. |

DAVID J. GALVIN, *Primary Examiner.*

DEUBEN EPSTEIN, GEORGE N. WESTBY, *Examiners.*

R. DZIURGOT, R. JUDD, *Assistant Examiners.*